June 19, 1956     H. G. DUNN     2,750,656
WRINGER ROLL
Filed April 22, 1953
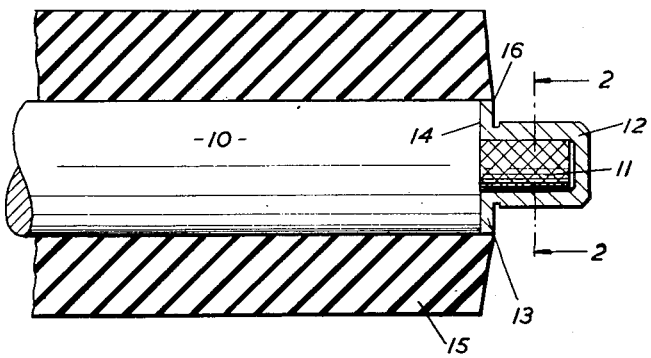
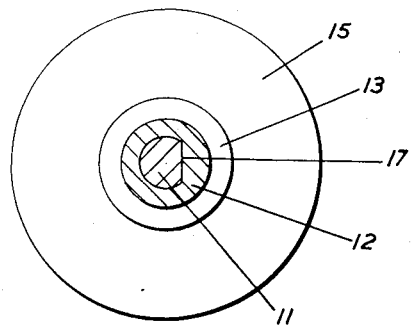
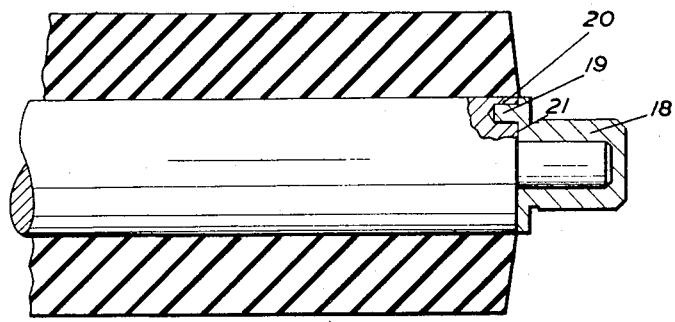
Inventor
HAROLD G. DUNN
By Harry S. Dunaway
Attorney

United States Patent Office 2,750,656
Patented June 19, 1956

2,750,656
WRINGER ROLL

Harold George Dunn, Perivale, Greenford, England, assignor to The Hoover Company, North Canton, Ohio, a corporation of Ohio Application April 22, 1953, Serial No. 350,401

2 Claims. (Cl. 29—123)

This invention relates to wringers and an object of the invention is to provide improved means for preventing rusting or corrosion of the shafts of wringer rollers, especially the parts which project to engage the bearings. On mechanical and economic grounds it is usually convenient to employ for the shafts a material such as mild steel, which is liable to rust when continually exposed to water and washing liquids. This is particularly serious in view of the fact that rust may stain the clothes.

According to the present invention a roller for a wringer has a shaft of corrodible material whereof a projecting portion is covered by a moulded, pressed or cast protective cover of corrosion resistant material. The cover may be moulded in situ or alternatively a cap may be moulded separately, fitted to the shaft, and secured in any convenient manner. The material of the protective cover may be metallic, or it may be carbon or metallised carbon or the cover may be moulded from a synthetic resin for instance nylon. Alternatively the cover may be of any suitable type of self-lubricating material, or it may be of graphite impregnated phenolic resin.

In one form of the invention the protective cover is moulded on or fitted to the shaft before the latter is fitted with the moulded rubber or like sleeve which forms the body of the roller. The latter may then serve to secure the cover in position as well as sealing it against the entry of water.

A modification of the invention also includes a method of constructing a roller for a wringer in which preformed protective caps are fitted to the ends of the roller shaft and a roller body is then moulded or fitted to the shaft so as to provide a watertight seal against the cap at each end.

The invention may be carried into practice in various ways but a number of specific embodiments will now be described by way of example with reference to the accompanying drawings in which:

Figure 1 is a part sectional view of a wringer roller incorporating an end protective cover according to the present invention, Figure 2 is a cross sectional view on the line 2—2 of Figure 1, and Figure 3 is a view similar to Figure 1 showing an alternative method of preventing relative rotation of the cover and roller shaft.

In the example shown in Figure 1 the invention is applied to a wringer roller comprising a shaft 10, made of mild steel. The end 11 of the shaft is reduced in diameter and a protective cover 12 of synthetic resin is moulded in situ around the end to the shape of a top hat. The flange or brim 13 of the cover fits flat against the shoulder 14 of the shaft and is held in position by a rubber roller body 15 which is fitted after the moulding of the cover 12, so as to provide a seal at 16 thus preventing access of washing liquids to the corrodible shaft 10.

The projecting end 11 of the shaft is diamond knurled to provide a suitable surface for gripping the moulded cover 12. The end 11 of the shaft is also provided with a flat 17 as shown in Figure 2 so that, when the cover 12 is moulded in position, relative rotation between it and the shaft 11 is effectively prevented.

In the modification shown in Figure 3 the protective cover 18 is moulded separately, and subsequently applied to the projecting end of the shaft. In this instance the cover is moulded with a small peg 19 which engages a corresponding hole 20 in the end of the flange 21 on the shaft, to provide an alternative method of preventing rotation of the cover about the shaft.

What I claim as my invention and desire to secure by Letters Patent is:

1. A wringer roll comprising a shouldered shaft of corrodible material, a bearing cap of corrosion resistant resin applied to each end of the shaft, each of the bearing caps having a portion covering an end face of the shaft and engaging a shouldered portion of the axial length thereof to seal the end face and engaged portion of the shaft against contact with washing liquids and a tubular cover of resilient material peripherally embracing the portion of the shaft between the bearing caps and forming the wringing surface of the roll and peripherally engaging the bearing caps to form a seal therewith whereby the entire shaft is protected from contact with washing liquids.

2. Apparatus according to claim 1 wherein the ends of the shaft are formed with a flat side and the rounded portions of the shaft ends are roughened and the bearing caps are molded in situ onto the flat and roughened portions of the shaft.

References Cited in the file of this patent

UNITED STATES PATENTS

| | | |
|---|---|---|
| 36,494 | Guild | Sept. 16, 1862 |
| 61,559 | Palmer | Jan. 29, 1867 |
| 141,424 | Capron | Aug. 5, 1873 |
| 2,086,787 | Whiteley | July 13, 1937 |
| 2,213,523 | Jones et al. | Sept. 3, 1940 |
| 2,246,086 | Austin | June 17, 1941 |
| 2,356,007 | Sanders | Aug. 15, 1944 |
| 2,627,228 | Bromley | Feb. 3, 1953 |

FOREIGN PATENTS

| | | |
|---|---|---|
| 98,600 | Germany | Aug. 30, 1878 |